United States Patent
Geng et al.

(10) Patent No.: US 12,346,655 B2
(45) Date of Patent: Jul. 1, 2025

(54) ENHANCED DOCUMENT VISUAL QUESTION ANSWERING SYSTEM VIA HIERARCHICAL ATTENTION

(71) Applicant: ADOBE INC., San Jose, CA (US)

(72) Inventors: Shijie Geng, Piscataway, NJ (US); Christopher Tensmeyer, Columbia, MD (US); Curtis Michael Wigington, San Jose, CA (US); Jiuxiang Gu, Baltimore, MD (US)

(73) Assignee: Adobe Inc., San Jose, CA (US)

( * ) Notice: Subject to any disclaimer, the term of this patent is extended or adjusted under 35 U.S.C. 154(b) by 544 days.

(21) Appl. No.: 17/528,972

(22) Filed: Nov. 17, 2021

(65) Prior Publication Data
US 2023/0153531 A1    May 18, 2023

(51) Int. Cl.
G06F 40/30 (2020.01)
G06F 16/2452 (2019.01)
G06F 40/284 (2020.01)
G06N 3/04 (2023.01)

(52) U.S. Cl.
CPC ...... *G06F 40/284* (2020.01); *G06F 16/24526* (2019.01); *G06N 3/04* (2013.01)

(58) Field of Classification Search
CPC .... G06F 40/211; G06F 40/253; G06F 40/268; G06F 40/284; G06F 40/30; G06N 3/04; G06N 3/0464; G06N 3/08
See application file for complete search history.

(56) References Cited

U.S. PATENT DOCUMENTS

| | | | |
|---|---|---|---|
| 10,754,851 B2* | 8/2020 | Cohen | G06N 3/042 |
| 11,620,451 B2* | 4/2023 | Dancewicz | G06F 40/30 |
| | | | 704/9 |
| 2021/0209139 A1* | 7/2021 | Wu | G06N 3/006 |

(Continued)

OTHER PUBLICATIONS

Title={ComQA: Compositional question answering via hierarchical graph neural networks}, author={Wang, Bingning and Yao, Ting and Chen, Weipeng and Xu, Jingfang and Wang, Xiaochuan}, booktitle={Proceedings of the Web Conference 2021}, pp. {2601-2612}, month =April, year={2021} (Year: 2021).*

(Continued)

*Primary Examiner* — Lamont M Spooner
(74) *Attorney, Agent, or Firm* — Shook, Hardy & Bacon L.L.P.

(57) ABSTRACT

Systems and methods for performing Document Visual Question Answering tasks are described. A document and query are received. The document encodes document tokens and the query encodes query tokens. The document is segmented into nested document sections, lines, and tokens. A nested structure of tokens is generated based on the segmented document. A feature vector for each token is generated. A graph structure is generated based on the nested structure of tokens. Each graph node corresponds to the query, a document section, a line, or a token. The node connections correspond to the nested structure. Each node is associated with the feature vector for the corresponding object. A graph attention network is employed to generate another embedding for each node. These embeddings are employed to identify a portion of the document that includes a response to the query. An indication of the identified portion of the document is be provided.

18 Claims, 9 Drawing Sheets

(56) References Cited

U.S. PATENT DOCUMENTS

| | | | | |
|---|---|---|---|---|
| 2021/0224332 | A1* | 7/2021 | Shekhar | G06N 3/08 |
| 2021/0264216 | A1* | 8/2021 | Liu | G06N 3/08 |
| 2021/0334457 | A1* | 10/2021 | Zhang | G06F 40/216 |
| 2021/0334708 | A1* | 10/2021 | Li | G06F 40/40 |
| 2021/0350076 | A1* | 11/2021 | Kantor | G06F 40/30 |
| 2022/0121679 | A1* | 4/2022 | Singh | G06F 40/216 |
| 2022/0284192 | A1* | 9/2022 | Pawar | G06F 40/205 |
| 2022/0309401 | A1* | 9/2022 | Park | G06N 5/04 |
| 2023/0351115 | A1* | 11/2023 | Zeng | G06V 30/413 |

OTHER PUBLICATIONS

Title={Document modeling with graph attention networks for multi-grained machine reading comprehension}, author={Zheng, Bo and Wen, Haoyang and Liang, Yaobo and Duan, Nan and Che, Wanxiang and Jiang, Daxin and Zhou, Ming and Liu, Ting}, journal={arXiv preprint arXiv:2005.05806}, year={2020} (Year: 2020).*

Title={Scientific literature summarization using document structure and hierarchical attention model}, author={Xu, Huiyan and Wang, Zhijian and Weng, Xiaolan}, journal={IEEE Access}, vol. {7}, pp. {185290-185300}, year={2019}, publisher={IEEE} (Year: 2019).*

Veličković, P., Cucurull, G., Casanova, A., Romero, A., Lio, P., & Bengio, Y. (2017). Graph attention networks. arXiv preprint arXiv:1710. 10903. 12 pages.

Hu, R., Singh, A., Darrell, T., & Rohrbach, M. (2020). Iterative answer prediction with pointer-augmented multimodal transformers for textvqa. In Proceedings of the IEEE/CVF Conference on Computer Vision and Pattern Recognition (pp. 9992-10002). 11 pages.

Singh, A., Natarajan, V., Shah, M., Jiang, Y., Chen, X., Batra, D., . . . & Rohrbach, M. (2019). Towards vqa models that can read. In Proceedings of the IEEE/CVF Conference on Computer Vision and Pattern Recognition (pp. 8317-8326).

Xu, Y., Li, M., Cui, L., Huang, S., Wei, F., & Zhou, M. (Aug. 2020). Layoutlm: Pre-training of text and layout for document image understanding. In Proceedings of the 26th ACM SIGKDD International Conference on Knowledge Discovery & Data Mining (pp. 1192-1200).

Devlin, J., Chang, M. W., Lee, K., & Toutanova, K. (2018). Bert: Pre-training of deep bidirectional transformers for language understanding. arXiv preprint arXiv:1810.04805. 16 pages.

Majumder, B., Potti, N., Tata, S., Wendt, J. B., Zhao, Q., & Najork, M. (2020). Representation learning for information extraction from form-like documents. 10 pages.

* cited by examiner

ENHANCED DOCUMENT VISUAL QUESTION ANSWERING SYSTEM VIA HIERARCHICAL ATTENTION

BACKGROUND

Visual Question Answering (VQA) tasks are an active area of research within the domain of machine vision (MV) and natural language processing (NLP) modeling. A general VQA task involves a machine receiving visual content (e.g., an image) and a text-based question related to the visual content. The machine is tasked with determining an answer to the question, via an NLP analysis of the question and an MV analysis of the visual content. A more specific example of a VQA task includes a Document VQA (DocVQA) task. A typical DocVQA task may involve a user providing a document and a text-based question (e.g., a query) related to the document. The document may be a visual document (e.g., a PDF file or an optical scan of a paper document) that includes text-based portions (e.g., chapters, sections, subsections, headings, paragraphs, sentences, captions, and the like) and visual objects (e.g., plots, formulas, tables, figures, charts, and the like).

Queries for such visual documents may include such questions as "What does the y-axis of the chart on the left measure?," "What is the date on the document's timestamp?," or "What time does my flight depart?". Accordingly, some DocVQA tasks may require spatial and/or visual reasoning, as well as hierarchical and semantic reasoning, applied to both the query and document. Conventional DocVQA approaches may be inadequate in implementing various aspects of spatial/visual, hierarchical, an/or semantic reasoning required for robust DocVQA-enabled systems.

For instance, some conventional approaches to implementing systems that are enabled to perform DocVQA tasks include attempting to generate textual answers (e.g., rather than locating the answer within the image). However, the generation of novel textual answers may be difficult for many questions. For example, vocabulary appropriate to answer some questions may not be included (or properly represented) within the model employed to generate the textual answers.

Other conventional approaches include introducing document layout information by additional 2D position embedding layers during pretraining of a MV model that analyzes the document. However, token-level 2D position embedding may not be robust enough to adequately represent various features encoded in the layout information (from a global view) of the document.

Still other conventional DocVQA approaches attempt to extract (e.g., as contrasted with approaches that generate novel) textual answers from the text of a document. However, these extractive approaches are typically designed and/or trained for extracting pre-defined target fields. Thus, these extractive conventional approaches may not be enabled to answer questions with answers that do not conform to the pre-defined target fields, or questions that involve hierarchical reasoning. As such, there is a need for improvements in the performance and capabilities of DocVQA-related systems.

SUMMARY

The embodiments are generally directed towards an enhanced DocVQA systems and methods. The systems and methods receive a document and a corresponding query (e.g., a question) from a device (e.g., from a user of a device). The system and embodiments locate (and extract) a response (e.g., an answer) for the query, from the text of document. The systems and methods further provide an indication of the located response to the user. The systems and methods include generating a set of embeddings for each document token (e.g., words included in document) and each query token (e.g., words included in the query) based on a physical layout of the document and semantic aspects of the document and/or query token. The systems and methods further include generating a hierarchical graph structure based on the document's layout (e.g., the graph's nodes correspond to the embeddings for the tokens and the connections between the nodes reflect the hierarchical nature of the document's layout).

The embodiments further include applying a graphical attention network (GAT) to the embeddings, based on the structure of the graph. The GAT applies self-attention between the embeddings of the tokens that are connected via the graph. In this way, the GAT propagates information, when locating the response to the query, in a similar fashion to that as a human reading the document. The embeddings for each token are based on the token's position within the layout of the document, as well as the semantics of the token. The GAT acts as a transformer encoder to generate an encoding that enables the selection of the portion of the document that corresponds to the answer.

Another aspect of the embodiments includes data augmentation when training the network. The data augmentation includes training the network under variations in the reading order of the document tokens. The reading order for the document tokens is determined when the document is segmented into document tokens. For training via data augmentation, the determined reading order for training documents may be varied from the original determined reading order to introduce variation in the reading order. Such variation during training may render the trained network more robust to documents with ambiguous reading orders (e.g., articles with figures, graphs, and tables).

In one non-limiting embodiment, a multiset of tokens is accessed and/or received. The multiset of tokens may include a multiset of document tokens included or encoded in a document that is received by a user. The multiset of tokens may additionally include a multiset of query tokens included or encoded in an associated query received from the user. A nested structure of the multiset of tokens may be generated based on a document structure of the document. Each token of the multiset of tokens may occupy a position of a set of nested positions within the nested structure of tokens.

A set of embeddings may be generated for each token of the multiset of tokens. The set of embeddings for a token may be based on a language model, as well as the token's position within the nested structure and various semantic aspects of the token. The set of embeddings for each token may be combined to generate a combined embedding (or feature vector) for the token.

A graph structure may be generated based on the nested structure of tokens. The graph structure may include a set of nodes and a set of edges. The set of nodes may include a query node, a set of query token nodes, a set of document-section nodes, a set of document-line nodes, and a set of document token nodes. Each node of the set of nodes may be associated with a token and the combined embedding (or feature vector) for the token. For instance, each document token of the multiset of document tokens may be associated with a document-token node of the set of document token nodes (which is a first subset of the set of nodes) and the document-token's feature vector. Each query token of the multiset of query tokens may be associated with a query token node of the set of query token nodes (which is a second subset of the set of nodes) and the query-token's feature vector. The set of edges connects each node of the set of nodes to one or more other nodes of the set of nodes based on positions that each associated document token and each associated query token occupies in the set of nested positions within the nested structure.

A GAT may be applied on the graph structure. The GAT applies a self-attention mechanism to nodes of the set of nodes that are connected by the set of edges. The GAT generates another representation (another embedding and/or feature vector) for each node of the set of nodes based on the self-attention. Based on the representation of each node (generated by the GAT) in the set of nodes, a portion of the document that encodes a response to the query is selected and/or identified. That is, the identified portion of the document may encode a multiset of query tokens that are associated with a response to the query. An indication of the identified portion of the document that encodes the response is provided to the user.

DETAILED DESCRIPTION OF THE EMBODIMENTS

Figure 1:
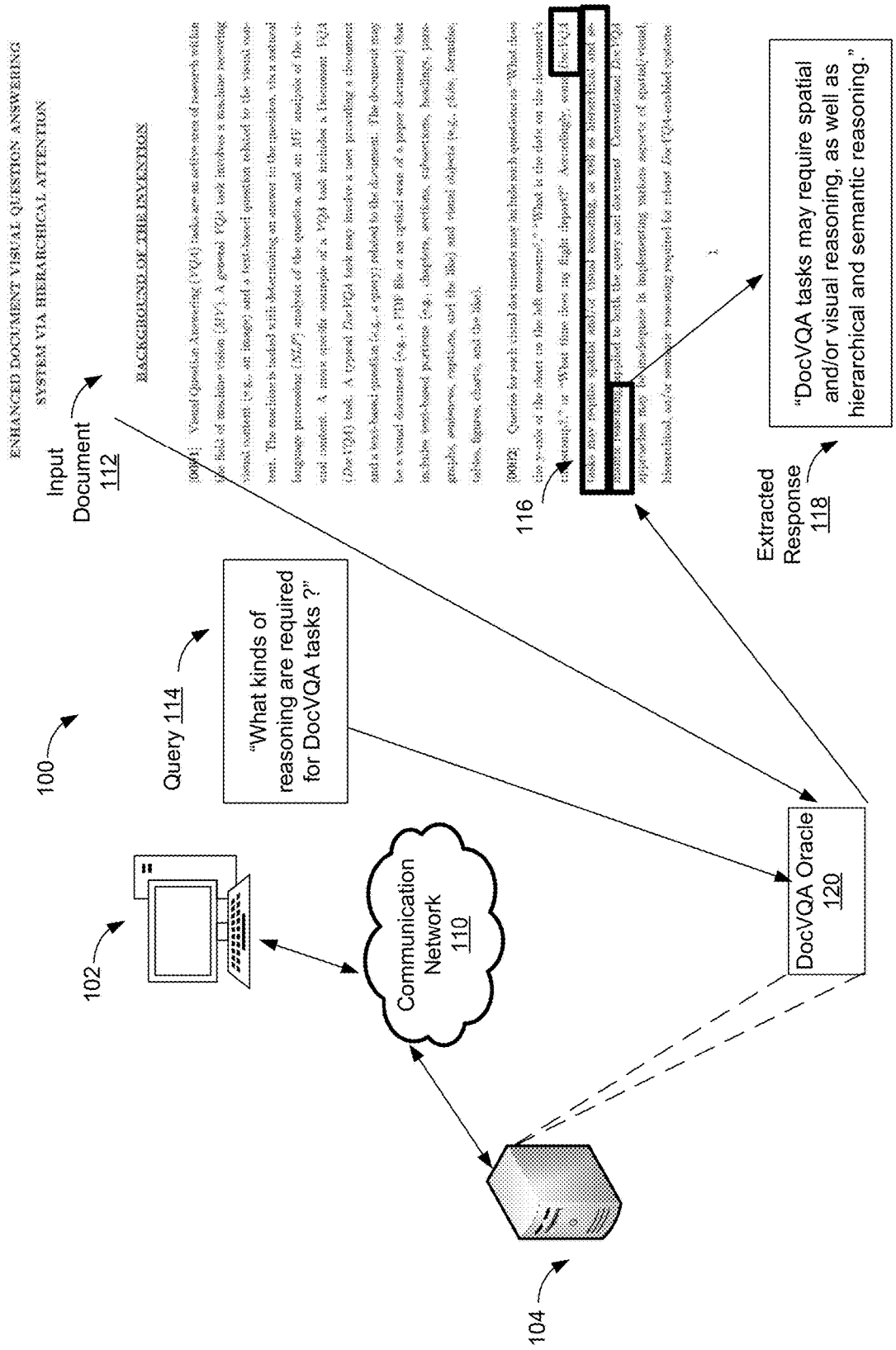
FIG. 1 illustrates an enhanced DocVQA system implementing various embodiments presented herein.

As noted above, conventional DocVQA are limited in their performance, and may fail to provide sufficient and accurate answers to a user's question regarding the content included in a document. Furthermore, as the complexity of document and queries increases, the computations involved with conventional DocVOA systems may scale dramatically and render such conventional approaches impractical. The embodiments are directed towards enhanced DocVQA methods and systems. As discussed throughout, the embodiments herein provide significant improvements in performance over conventional DocVQA approaches. More specifically, the embodiments provide an improvement (e.g., as compared to conventional DocVQA systems) in providing sufficient and accurate answers to queries associated with a document, while reducing the significant space and time complexities associated with conventional DocVQA systems.

The embodiments are directed towards enhanced DocVQA methods and systems that "extract" a response to a query from a corresponding document. That is, upon receiving a document and a corresponding question (e.g., a query), a portion of the document (e.g., a portion that includes textual content) is identified and extracted. The identified portion of the document includes an answer (e.g., a response) to the query. As discussed throughout, and in contrast to conventional approaches, the embodiments leverage the spatial layout of the document to generate a hierarchical relationship between the query and the information (e.g., document tokens) encoded in the document. The hierarchical relationships are encoded in a graph data structure. An analysis is performed, based on a hierarchical structure of the graph, that processes each portion of the document to determine a relevancy to the query. In the analysis, the hierarchical structure of the graph is employed to selectively focus attention (e.g., neural network-based attention mechanisms) between the query and the document, as well as between the different portions of the document. As discussed throughout, via the selective self-attention that is propagated according to the hierarchical relationships of the graph, the embodiments provide many performance and computational-efficiency enhancements over conventional DocVQA approaches. That is, the various embodiments provide (as compared to conventional approaches) an increased accuracy when extracting a response to the query from the document, while reducing the time and space complexity of the underlying computations.

More particularly, the methods and systems receive a document and a corresponding question (e.g., a query). The document and the query may be received from a user. The document encodes document tokens and the query encodes query tokens. The embodiments analyze the spatial layout of the document to generate a nested structure of the tokens. Within the nested structure, the document tokens and the query tokens are located within nested positions, based on the token's location in the document or query. The nested structured is based on a document layout structure determined via a machine vision (MV) analysis of the spatial layout of the document. The document structure includes three main elements: document sections, text (or textual) lines, and document tokens. The document is segmented into a set of document sections. Each document section is segmented into a set of lines. Each line is segmented into a multiset of document tokens. Thus, in the nested structure, the textual lines are nested within corresponding document sections. The document tokens are nested within corresponding textual lines. In the nested structure, the query tokens are positioned outside of the document sections and textual lines.

In some embodiments, the nested structure organizes the document tokens under the corresponding nested document sections and lines, and into an inferred linear-"reading order," (e.g., a reading order based on a reading order of the document sections, a reading order of the textual lines in each document section, and a reading order for each of the document tokens included in each of the textual lines). A set of embeddings is generated for each token based on one or more transformer-encoder language models (e.g., a pretrained ALBERT model). The set of embeddings for a token also depends upon where the token is positioned within the nested structure. A combined embedding for each token may be generated based on a combination (e.g., a concatenation or a vector addition) of a set of embeddings for the token. A portion of the set of embeddings may be indicative of semantic aspects (or features) of the token. Another portion of the set of embeddings may be indicative of the token's position within the nested structure of tokens (e.g., layout features of the token within the document).

The nested structure is employed to generate a hierarchical graph structure. Some nodes of the graph represent a document or a query token (and the token's embedding). Other nodes in the graph represent the query, document sections, and textual lines. Each node is associated with a token and an embedding of the token (as described below). The graph edges are generated from the nested relationships between the query, the document sections, the textual lines, and the tokens within the nested structure. The graph is hierarchical in the sense that the topology of the graph resembles a data tree structure. A root node, at the top of the graph's hierarchy, corresponds to the query. Leaf nodes of the graph correspond to document tokens and query tokens. The token embeddings are provided to a graph attention network (GAT). The GAT applies self-attention mechanisms between embeddings that are connected via the edges of the graph (e.g., for some "neighborhood" of the graph). The self-attention, based on the graph structure, enables the identification of a portion of the document that includes an answer to the query. The identification of the portion of the document that includes the answer may be provided to the user. Accordingly, the embodiments may be said to be extractive, in the sense that the embodiments extract the answer to the query from the document.

In the following discussion, the document is considered to be comprised of image data encoding a visual image of a single page. However, the embodiments are not so limited, and the document may include multiple images of multiple pages. Upon receiving the document and the query, the embodiments initially segment the document into a nested structure by analyzing the spatial layout of the document. The nested structure includes document tokens nested within textual lines. The textual lines are nested within their associated document sections. That is, the document is segmented into a set of document sections. Each document section of the set of document sections may be segmented into a set of textual lines. Each line of each set of lines of each document section may be segmented into a multiset of document tokens.

Accordingly, within the nested structure, each textual line of the document is nested within an associated document section. Furthermore, within the nested structure, each document token may be nested within an associated textual line. Each textual line may be nested within its associated document section. Thus, the nesting of the document is generally as follows: document sections→textual lines→document tokens. It should be noted that for embodiments that are enabled to perform DocVQA tasks on multi-page documents, the nesting structure may be structured to include a set of pages. Within each page of the set of pages, a set of document sections is nested. Thus, for embodiments that are enabled to receive a document of multiple pages, the segmenting of the document into a nested structure may be as follows: document pages→document sections→textual lines→document tokens. As shown in nested structure 400 of FIG. 4, the query tokens may also be included in the nested structure, but are not nested within the document sections and lines.

Additionally, a reading order of the set of document sections may be inferred from the spatial layout of the document sections. A reading order of the set of lines of each document section may be inferred from the spatial layout of the lines. A reading order of the document tokens included in each line of each document section may be inferred from the spatial layout of the tokens within the lines. Thus, a reading order of all the tokens may be inferred, where it is assumed that the query is read before the document. Accordingly, a global-position index may be assigned to each token within the nested structure. More succinctly, generating the nested structure enables assigning, to each token within the nested structure, a set of indices (e.g., one or more integer indices) that indicate the token's position within the nested structure. For example, a first index (e.g., a document-section index) may indicate which document section the token is associated with. A second index (e.g., a line index) may indicate which line (within the document section) the token is associated with. A third index (e.g., a global-position index) may indicate the global reading order associated with the token.

In some embodiments, each section of the set of document sections is classified as one or more section types of a set of section types. Such section types include, but are not necessarily limited to paragraph, header, list item, table, figure, footnote, background, and the like. The section type classification of a document section may be imputed to each textual line nested in the document section. Recursive imputation enables the imputation of the section type classification to each document token nested within each line of the document section. The document-section index, the document-section classification, the line index, and the global-position index may be referred to as layout features or aspects of the token. Because the number of possible document section types is finite, a fourth index (e.g., a section-type) index may be assigned to each token, indicating the associated document section type.

In addition to such layout features, one or more semantic features or aspects may be determined for each document token. Such semantic classifications of a document token may include, but are limited to a Part-of-Speech (POS) classification and a Named-Entity-Recognition (NER) classification. A document token may be assigned one or more POS types (or labels) from a set of POS types. The set of POS types may include, but is not limited to a noun, a verb, an adjective, an adverb, a number, and the like. A document token may also be assigned one or more NER types (or labels) from a set of NER types. The set of NER types may include, but is not limited to a person, an organization, a location, a date, and the like. Thus, each document token may be associated with one or more layout features and one or more semantic features. Because both the number of possible NER types and the number of possible POS types are finite, each token may be assigned a fifth index (e.g., a NER index) that indicates the token's NER type and a sixth index that indicates the token's POS type.

Each embedding of the set of embeddings for a token may be indicative of one of the six indices assigned to the token. A seventh embedding (e.g., a token embedding) may be generated for each token. The token embedding may be based on a transformer-encoder model (e.g., a BERT or and ALBERT model). The seven embeddings may be combined (e.g., concatenated) to form the combined embedding for the token. The combined embedding for a token may be a feature vector for the token.

After (or before) constructing an initial feature vector (e.g., the combination of the set of embeddings) for each token, the graph structure is generated. The graph indicates a hierarchy of the query, the document sections, the textual lines, and the tokens. For nodes representing the tokens, the node is associated with the token's feature vectors. For nodes representing the query, the document sections, and the textual lines, special embeddings (and special tokens) are associated with the node. A query special token (and a corresponding query embedding) is associated with a query node. A document section special token (and a corresponding document-section embedding) is associated with each node representing the document section. A line special token (and a corresponding line embedding) is associated with each node representing a line. The GAT is applied to the feature vectors based on the hierarchy of the graph. The GAT propagates information along a hierarchical structure.

In the graph, the query is at the top of the hierarchy, followed by document sections, which are broken down into lines, and each line is broken down into a sequence of tokens. The query node (and thus the query's special token and corresponding embedding) is connected to each query node (and thus the to query token's feature vector). The query node is also connected to each document section node (and thus to the section's special token and its embedding). Each document-section node is connected to each of its textual-line nodes (and thus to the line's special token and corresponding embedding). Each line node is connected to each of the document-token nodes (and the document token's feature vector).

The connections in the graph determine the local neighborhood for the graph attention convolution operation, which is similar to what a transformer layer does with masked attention. In some embodiments, each token is only allowed to attend to other tokens it is directly connected to in the graph, via a single edge. In other embodiments, a node may be able to attend to other nodes that are indirectly connected to the node via two or more edges (e.g., two or more hops are required to travel from one node to another node). This sparse connectivity of the graph decreases spatial and time complexity of the embodiments, compared to conventional DocVQA systems, or graphs that are fully connected. The hierarchical nature of the graph's connectivity has advantages over purely local connectivity patterns (e.g. every token only can attend to tokens with a linear distance of d) because information can propagate efficiently from distant tokens via the document section connections.

The application of the GAT enables the prediction of which document tokens should be included in the response to the query. Also, the application of the GAT enables prediction of which lines and which document sections includes spans of document tokens that are included in the response. These predictions are employed in a loss function (for training the GAT) that enables the GAT to attend to the general region of the document where the response may be be found, in addition to searching for the exact response within the identified span.

Various embodiments also employ data augmentation (with respect to reading order of the document sections) when training the GAT. The embodiments depend upon a linear sequence (e.g., an inferred reading order) of the document tokens. More specifically, the embodiments encode the linear position of a document token (e.g., as indicated by the token's global-position index) in the token's set of embeddings. Accordingly, the ordering of the document tokens has a direct impact on the output of the embodiments. Conventional DocVQA systems may simply use a left-right top-bottom ordering of the optical character recognition (OCR) text lines, which may result in incorrect results for non-trivial document layouts (e.g. 2 column layouts). Based on the document-section index associated with the textual lines (e.g., the document-section index which is imputed to the lines and document tokens), during training, the various embodiments may aggregate and rearrange textual lines to a more coherent reading order, thus avoiding the problem that lines in the same section are not contiguous due to a scanning order that the document was scanned in.

In some complex documents, there is not a single "correct" reading order. Various embodiments, when training the model, may permute the order of the document sections when linearizing and/or sequencing the document tokens to create additional training samples that capture the ambiguity of linear reading orders. Additionally, often answering a question only requires examining a single document section and adjacent document sections and the linear reading order of the sections is somewhat irrelevant. When this occurs for a query-document instance, permuting the ordering of the document sections during training helps the model learn to ignore irrelevant context.

Such data augmentation may be applied at training time to artificially expand the training set since obtaining labeled data for this task is expensive. Data augmentation may also be applied at test time to average predictions over multiple linearizations of the document to improve prediction accuracy.

The various embodiments provide numerous performance benefits over conventional approaches to DocVQA. In contrast to conventional DocVQA approaches, the embodiments described herein include a hierarchical layout graph model that enables both top-down and bottom-up reasoning to locate where an answer (e.g., a response to a query) is in a document based on both global and local contexts. In further contrast to conventional approaches, the embodiments include learnable token embeddings based on both layout of the document and semantic information encoded in the document. Furthermore, the embodiments include data augmentation training methods where OCR'ed lines (of the document) are reordered based on the nesting of the lines withing larger document structures. Such features provide performance advantages over conventional DocVQA solutions.

Example Operating Environment for DocVQA Tasks

FIG. 1 illustrates an enhanced DocVQA system 100 implementing various embodiments presented herein. DocVQA system 100 is enabled to perform various DocVQA tasks. DocVQA 100 may include at least a client computing device 102 and a server computing device 104, in communication via a communication network 110. The client computing device 102 can provide an input document 112 and an associated query 114 to the server computing device 104, via the communication network 110. The server computing device 104 implements a DocVQA oracle 120. The DocVQA oracle 120 is enabled to identify and extract a response (e.g., extracted response 118) to the query 114 from the input document 112. In some embodiments, the DocVQA oracle 120 is enabled to provide an indication (e.g., a highlight 116) of the extracted response 118 within the input document 112. The extracted response 118 and/or the highlight 116 may be provided to the client computing device 102. Because the DocVQA oracle 120 searches for and locates a response, within a document, to a query, the DocVQA 120 may be a document search engine. Although a client/server architecture is shown in FIG. 1, the embodiments are not limited to such architectures. For example, client computing device 102 may implement the DocVQA oracle 120, obviating the offloading of such DocVQA tasks to server devices.

In the non-limiting embodiment of DocVQA system 100, the query 114 includes the question "What kinds of reasoning are required for DocVQA tasks?". The DocVQA oracle 120 identifies and selects the answer (e.g., the extracted response 118) from the input document 112. The extracted response 118 includes the answer "DocVQA tasks may require spatial and/or visual reasoning, as well as hierarchical and semantic reasoning," which is shown in the text of the document 112 via the thick bounding box (e.g., highlight 116).

Also, in the non-limiting embodiment, the input document 112 includes an image of a single page. However, as noted throughout, the embodiments are not so limited, and may include documents of a plurality of pages. Furthermore, if the input document 112 is not an image, a bit-map (e.g., an image) of the input document 112 may be generated. For example, an optical scan of the document may be generated, or a PDF of a non-image document (e.g., a word processing document, spreadsheet document, a slide deck document, or the like) may be generated. A non-limiting embodiment of such a DocVQA oracle 120 (or document search engine) is discussed at least in conjunction with enhanced DocVQA oracle 200 of FIG. 2.

Communication network 110 may be a general or specific communication network and may directly and/or indirectly communicatively coupled to client computing device 102 and server computing device 104. Communication network 110 may be any communication network, including virtually any wired and/or wireless communication technologies, wired and/or wireless communication protocols, and the like. Communication network 110 may be virtually any communication network that communicatively couples a plurality of computing devices and storage devices in such a way as to computing devices to exchange information via communication network 110.

Non-Limiting Embodiments of DocVQA Oracles

Figure 2:
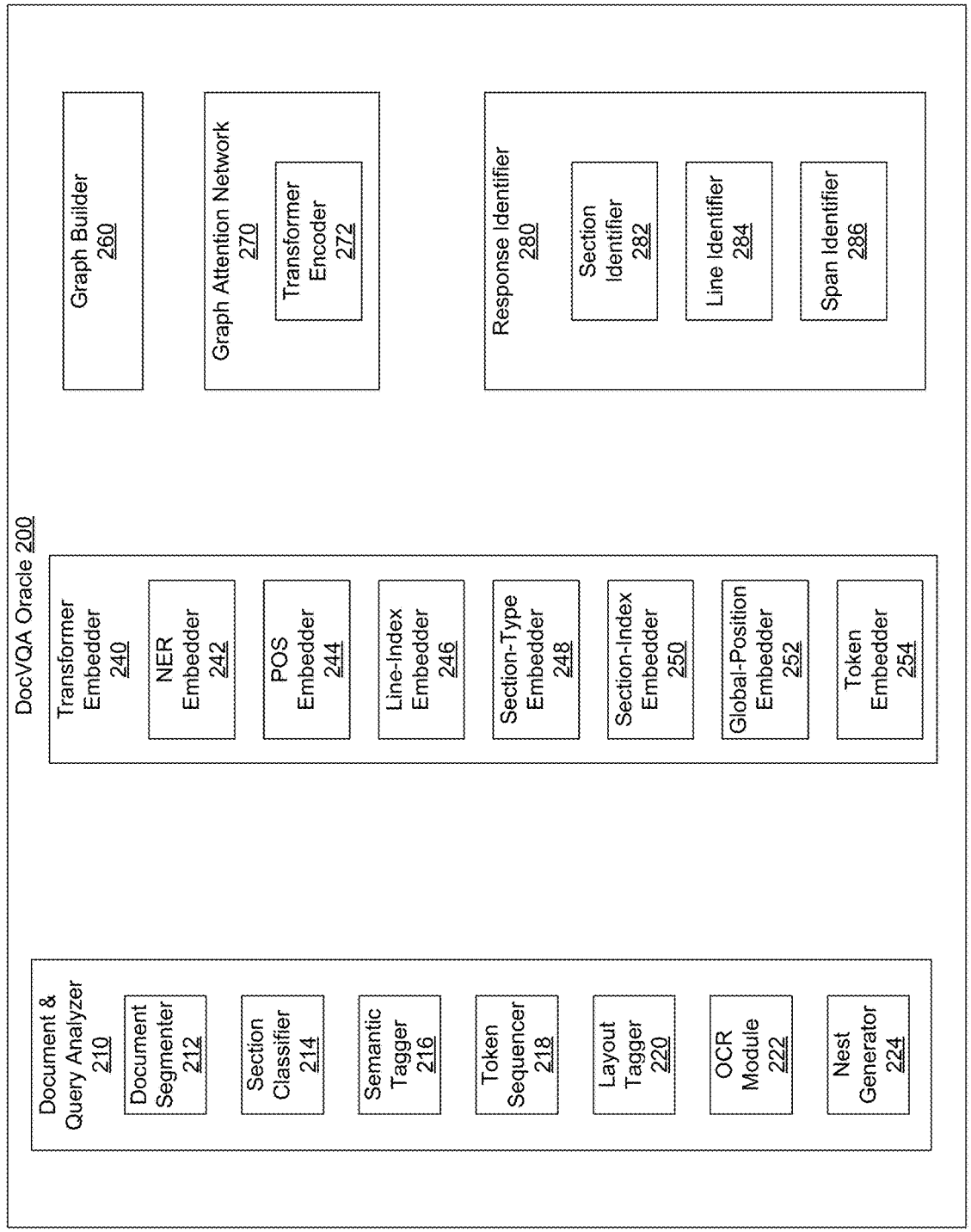
FIG. 2 illustrates an enhanced DocVQA oracle for performing DocVQA task, according to various embodiments presented herein.

FIG. 2 illustrates an enhanced DocVQA oracle 200 for performing DocVQA tasks. DocVQA oracle 200 may be similar to DocVQA 120 of FIG. 1. Accordingly, DocVQA oracle 200 may be employed in a DocVQA system, such as but not limited to DocVQA system 100 of FIG. 1. As shown in FIG. 2, a non-limiting embodiment of a DocVQA 200 may include a document and query analyzer 210, a transformer embedder 240, a graph builder 260, a graph attention network (GAT) 270, and a response identifier 280.

As noted throughout, a DocVQA oracle or a document search engine (e.g., DocVQA oracle 200) may receive a document (e.g., input document 112 of FIG. 1) and a corresponding question (e.g., query 114 of FIG. 1). The document and query analyzer 210 is generally responsible for analyzing the spatial layout (e.g., a document structure) of the input document and the query to form a multiset of document tokens (e.g., words encoded in the document) and a multiset of query tokens (e.g., words encoded in the query). The input document may be an image (e.g., an image of a document). In other embodiments, the document may be converted to an image via an optical scanning process. The analysis of the spatial layout of the document may include a machine vision (MV) analysis of the spatial layout of the document. The multiset of the document tokens may be generated via an optical character recognition (CR) analysis of the text encoded in the pixel data of the image data of the document. A multiset of tokens, which includes the multiset of document tokens and the multiset of query tokens, may be formed. As described below, the document and query analyzer 210 may form a nested structure of tokens, where each of the tokens is positioned within a position of the nested structure based on the document structure.

The transformer embedder 240 is generally responsible for generating a set of embeddings for each token of the multiset of tokens. A first subset of the set of embeddings for a token may be referred to as a set of layout embeddings. The layout embeddings for a token encode features of the token that reflect the token's position in the nested structure of tokens generated by the document and query analyzer 210. Each of the embeddings of the set of embeddings for a token may be combined to form a combined embedding for the token (e.g., a feature vector for the token).

The graph builder 260 is generally responsible for building a hierarchical graph structure based on the nested structure of tokens (e.g., the nested structure generated by the document and query analyzer 210). At least a portion of the nodes of the graph correspond to tokens of the multiset of tokens. The structure of the graph may mirror at least some aspects of the nested structure (e.g., the positioning of the tokens within the nested structure). The graph may be hierarchical in nature. The hierarchical structure of the graph may be generally: query→document sections→textual lines→document tokens.

The GAT 270 is generally responsible for generating an encoding for the multiset of tokens. More specifically, the GAT 270 may apply a self-attention mechanism to the combined embeddings of the tokens, wherein the self-attention is between tokens connected by edges of the graph structure, as discussed throughout. Based on the encoding of the multiset of tokens, the response identifier 280 is generally responsible for selecting and/or identifying a portion of the document that includes a response to the query. An indication of the selected portion of the document may be provided to a user (e.g., the user that provided the document and query).

Figure 3A:
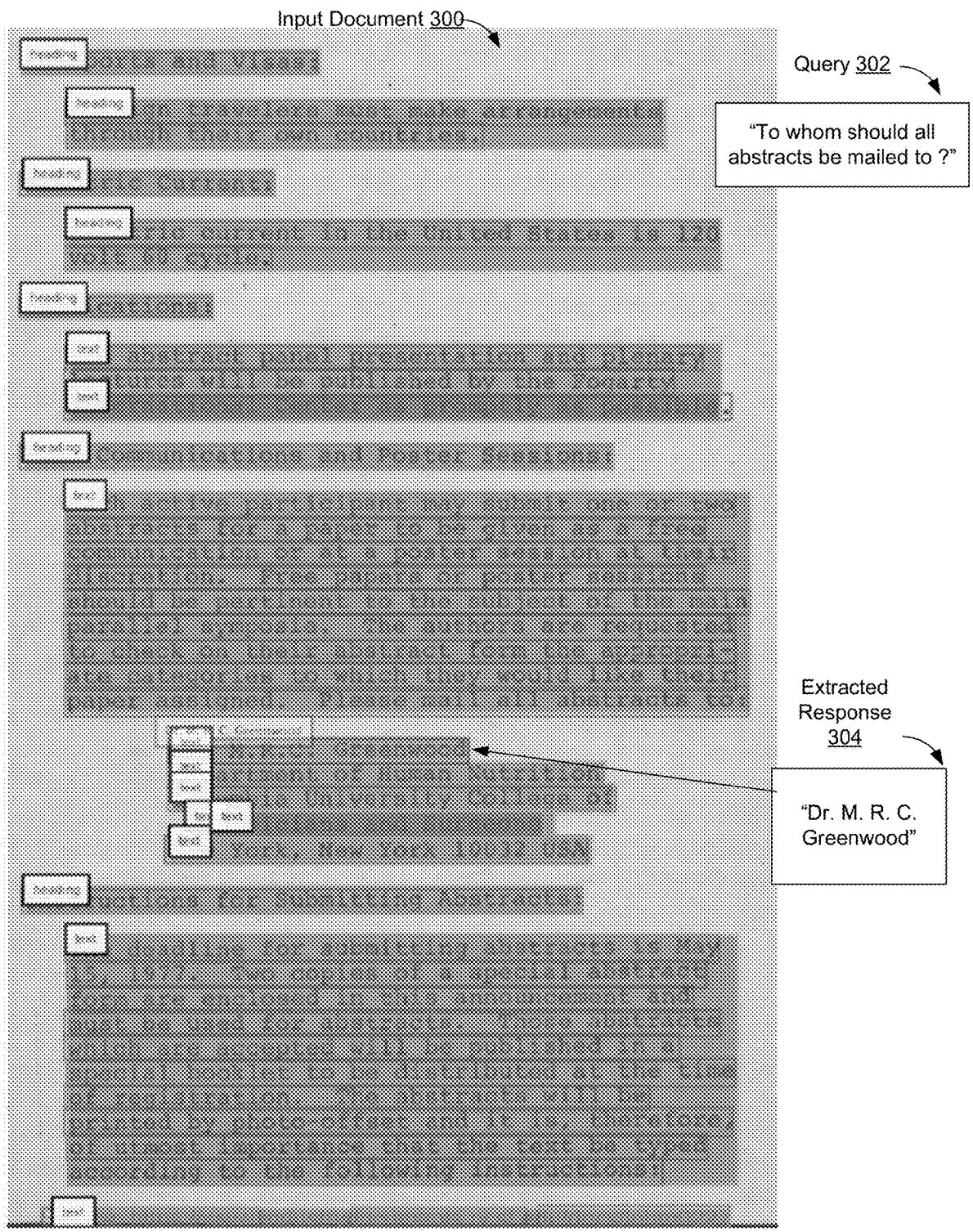
FIG. 3A illustrates an input document, an associated query, and a response to the query, extracted from the document, according to various embodiments.
Figure 3B:
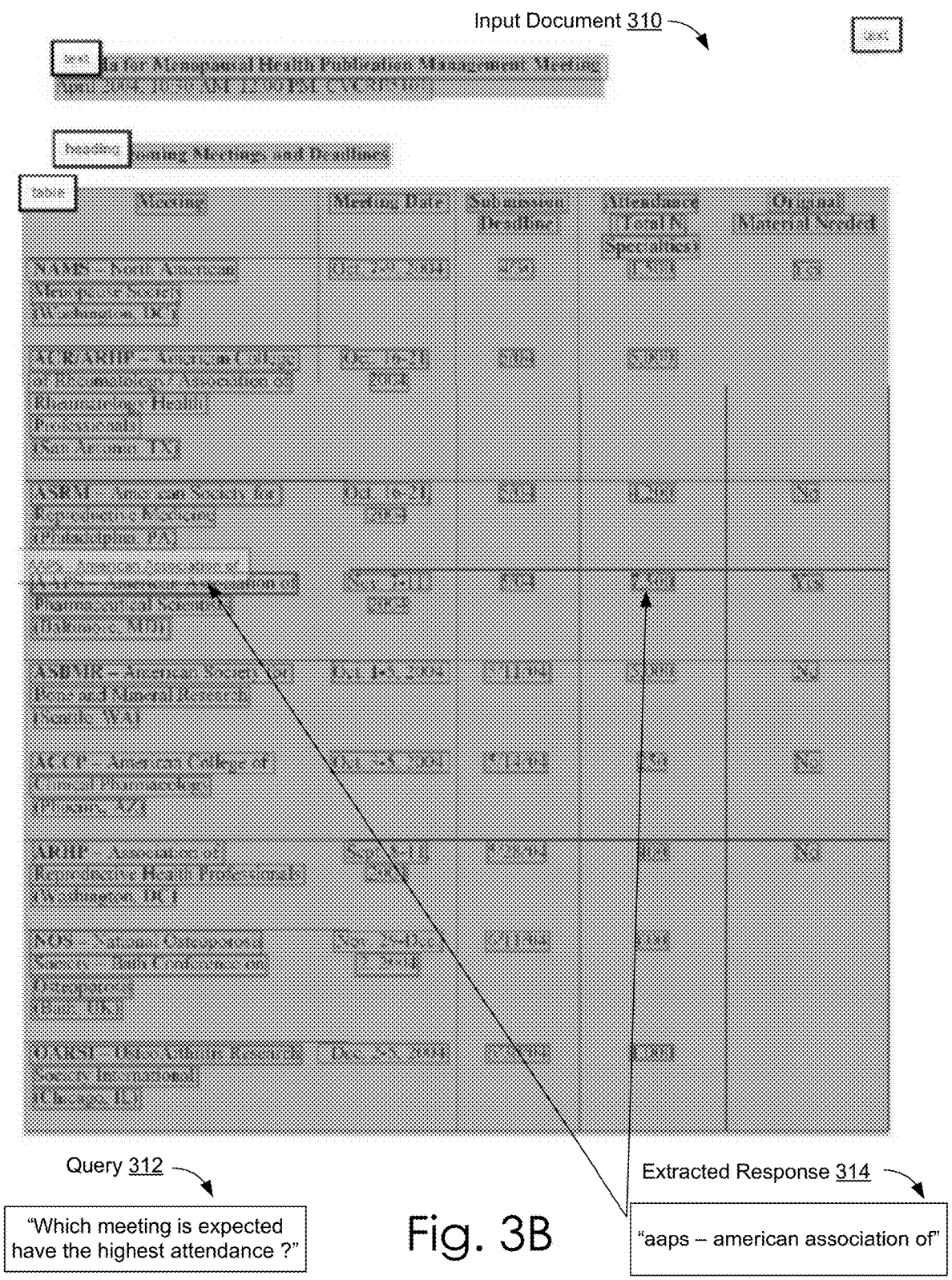
FIG. 3B illustrates another input document, an associated query, and a response to the query, extracted from the document, according to various embodiments.

More specifically, the document and section analyzer 210 may include a document segmenter 212, a section classifier 214, a semantic tagger 216, a token sequencer 218, a layout tagger 220, an OCR module 220, and a nest generator 224. The document and section analyzer 210 is discussed in conjunction with at least FIGS. 3A-3B. FIG. 3A illustrates an input document 300, an associated query 302, and a response to the query 304, extracted from the document, according to various embodiments. FIG. 3B illustrates another input document 310, an associated query 312, and a response to the query 314, extracted from the document, according to various embodiments.

Referring to FIG. 3A, the query 302 referring to the document 300 includes the question "To whom should all abstracts be mailed to?" The response 304 extracted from the document 300 (via DocVQA oracle 200) includes the answer "Dr. M.R.C. Greenwood." The arrow originating from the response 304 illustrates the portion of the document 300, wherein the response 304 was extracted from.

Referring to FIG. 3B, the query 312 referring to the document 310 includes the question "Which meeting is expected to have the highest attendance?" The response 314 extracted from the document 310 (via DocVQA oracle 200) includes the answer "aaps—american association of." The arrow originating from the response 314 illustrates the portion of the document 310, wherein the response 314 was extracted from.

Returning to the functionalities and operations of the document and query analyzer 210, the document segmenter 212 is generally responsible for segmenting the input document into a set of document sections. Document segmenter 212 further segments each document section of the set of document sections into a set of textual lines. Document segmenter 212 further segments each textual line of the set of textual lines of each document section into a multiset of document tokens. The union of the multiset of documents tokens of each of the set of lines of each of the document segments is included in the multiset of tokens for the document. The document segmenter 212 may employ the OCR module 222 to scan characters encoded in the image data to determine document tokens from the pixels of the image data of the document. FIGS. 3A-3B illustrate the segmenting of documents 300 and 310, respectively, segmenting into a set of document sections and into the various sets of lines. The lines included in the various sets of lines include multisets of document tokens.

The section classifier 214 is generally responsible for classifying each document section of the set of document sections. The set of possible document section types may include, but is not limited to paragraph, header, list item, table, figure, footnote, background, and the like. In FIGS. 3A-3B, the document sections of the input documents 300 and 310 are tagged with corresponding document section types, determined via the section classifier 214.

The semantic tagger 216 is generally responsible for classifying one or more semantic features of the document tokens. In some embodiments, each of the document tokens is classified via one or more named-entity-recognition (NER) labels (or tags) and one or more part-of-speech (POS) labels. That is, the semantic tagger 216 may assign (or tag) at least a portion of the document tokens with one or more POS types (or labels) from a set of POS types. The set of POS types may include, but is not limited to a noun, a verb, an adjective, an adverb, a number, and the like. The semantic tagger 216 may assign (or tag) at least a portion of the document tokens with one or more NER types (or labels) from a set of NER types. The set of NER types may include, but is not limited to a person, an organization, a location, a date, and the like. Thus, each document token may associated with one or more layout features and one or more semantic features.

The token sequencer 218 is generally responsible for determining a reading order (e.g., a sequential order) for the document sections of the set of document sections. The token sequencer 218 may additionally determine a reading order of the set of lines of each document section of the set of document sections. The token sequencer 218 may additionally determine a reading order of the set of lines of each document section of the set of document sections. Note that by determining a sequential-order of the set of document sections, a sequential-order of each of the set of lines, and a sequential-order of each of the multiset of document tokens induces a sequential-order (e.g., a reading order) on the multiset of document tokens for the document. The sequential order of the multiset of document tokens may be employed to generate a sequential-order for the multiset of tokens (including the multiset of query tokens). In some embodiments, the query tokens are placed ahead of the document tokens in the sequential-order of the multiset of tokens.

The layout tagger 220 is generally responsible for classifying one or more layout features of the document tokens. Such layout features may include a document section-index, a document-section type, a line-index, and a global-position index. The document section-index of a document token may be indicative of its associated document section of the set of document sections. The document-section type of a document token may indicate the type of section of its associated section. The global-position index of a token may indicate the token's position within the sequential-order of the multiset of tokens. In some embodiments, a POS index, indicating the POS type of the token may be assigned to the token. Additionally, NER index, indicating the NER type of the token may be assigned to the token.

Figure 4:
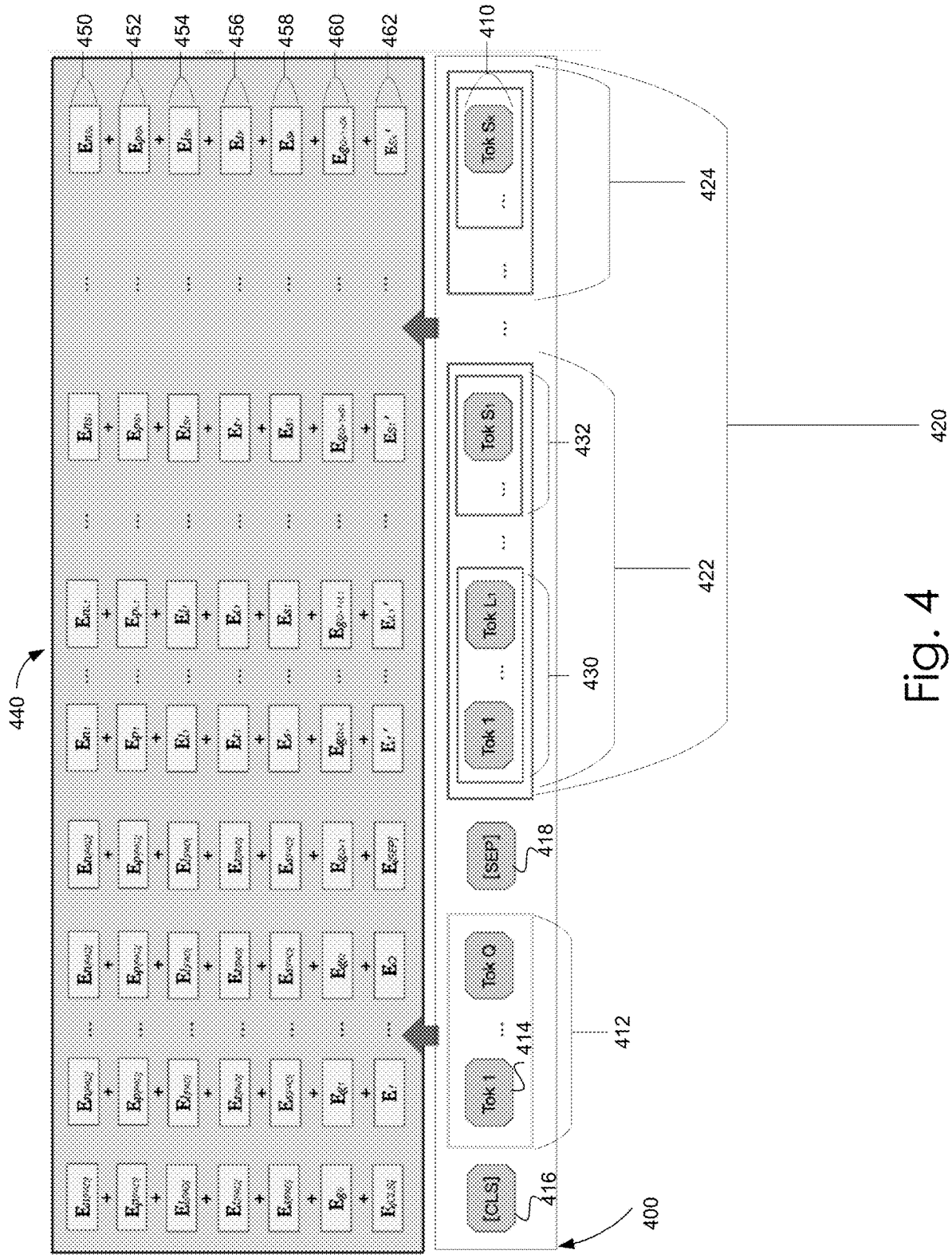
FIG. 4 illustrates an example of a nested structure for a multiset of tokens and a set of embeddings for each token in the nested structure, in accordance with various embodiments.

The nest generator 224 is generally responsible for generating a nested structure of the multiset of tokens based on the layout features of the tokens of the multiset of tokens. The nested structure is discussed in conjunction with FIG. 4. FIG. 4 illustrates an example of a nested structure 400 for a multiset of tokens 410 and a set of embeddings 440 for each token in the nested structure 400, in accordance with various embodiments. In FIG. 4, the multiset of tokens 410 is shown is shown as a linear (horizontal) string of tokens. The multiset of tokens 410 includes a multiset of query tokens 412 (e.g., tokens encoded in a query) and a multiset of document tokens 420 (e.g., tokens encoded in the corresponding document). A set of embeddings is shown as a vertical band of embeddings above each token in the nested structure 400. The set of embeddings may be combined (e.g., concatenated) to form a combined embedding (e.g., a feature vector) for each token, as indicated by the "+" to "add" the embeddings together.

An initialization or "clear-screen" token (e.g., "CLS" 416) is inserted at the beginning of the multiset of tokens 410 within the nested structure 400. The multiset of tokens 410 is shown in a "flat" linear order, as a horizontal string of tokens 410. The multiset of query tokens 412 (e.g., $Tok_1$ .... $Tok_Q$) is positioned before the multiset of document tokens 420 in the sequential-order of the multiset of tokens 410. The sequential-order of the multiset of query tokens 412 (e.g., as established by the query) is conserved in the sequential-order of the multiset of tokens 410. The multiset of query tokens 412 includes a first query token 414 (e.g., $Tok_1$). A separator token (e.g., "SEP" toke 418) is positioned between the multiset of query tokens 412 and the multiset of document tokens 420.

In the nested structure of tokens 400, the sets of lines nested within the document sections are shown via the nested boxes within FIG. 4. For example, the set of documents sections include a first document section 422 and a second document section 424. The first document section 422 includes a first text line 430 and a second text line 432.

Returning to the functionality of the transformer embedder 240 of FIG. 2, the transformer embedder 240 is generally responsible for generating the set of embeddings 440 (of FIG. 4) based on the nested structure 400 (of FIG. 4) and the multiset of tokens 410 (of FIG. 4) included in the nested structure 400. The set of embeddings for a token may include a set of semantic embeddings and a set of layout embeddings, as well as a token embedding and a global-position embedding. The set of semantic embeddings may include a NER embedding and a POS embedding, indicating the NER type and the POS type for the token. The set of layout embeddings may include a line-index embedding, a section-index embedding, and a section-type embedding.

The transformer embedder 240 may include a NER embedder 242, a POS embedder 244, a line-index embedder 246, a section-type embedder 248, a section-index embedder 250, a global-position embedder 252, and a token embedder 254. The NER embedder 242 is generally responsible for generating the NER embeddings for the tokens. The POS embedder 244 is generally responsible for generating the POS embedding for the tokens. The line-index embedder 246 is generally responsible for generating the line-index embeddings for the tokens. The section-type embedder 248 is generally responsible for generating the section-type embeddings for the tokens. The section-index embedder 250 is generally responsible for generating the section-index embedding for the tokens. The global-position embedder 252 is generally responsible for generating the global-position embeddings for the tokens. The token embedder 254 is generally responsible for generating the token embeddings for the tokens.

As shown by the vertical bars (or columns) of embeddings (positioned above each token in the multiset of tokens 410), the transformer embedder 240 generates a set of embeddings for each token. The set of embeddings may be combined (e.g., added or concatenated) to generate a combined embedding for each token (e.g., a feature vector for the token), as shown by the addition signs connecting the set of embeddings for each token.

Each horizontal row of embeddings 400 corresponds to an embedding of the set of embeddings for the corresponding token. Horizontal row 462 shows a token embedding for each token. The token embedder 254 may generate the token embedding via a token embedding model, such as but not limited to a bidirectional encoder representations from transformers (BERT) or BERT-style token embedding model. In at least one embodiment, a pre-trained light BERT (ALBERT) model may be employed to generate a token embedding 462 for each token. The token embedding for the tokens is indicated as $E_{Token_{index}}$. Horizontal row 464 shows a global-position embedding. The global-position embedding for a token indicates the token's global position in the sequential-order of the multiset of tokens 410. The global-position embedding for the tokens is indicated as $E_{g[Token_{index}]}$.

The horizontal row 450 shows a NER embedding for each token of the multiset of tokens 410. The NER embedding indicates the NER type for the token, determined by the semantic tagger 216. In some embodiments, a NER tag is not provided to query tokens, and thus a null embedding (e.g., a padded embedding) may be assigned to the NER embedding of each query token in horizontal row 450. The padded embeddings for NER embeddings for the query tokens are indicated as $E_{n[PAD]}$. The NER embeddings for the document tokens are indicated as $E_{n[Token_{index}]}$.

The horizontal row 452 shows a POS embedding for each token of the multiset of tokens 410. The POS embedding indicates the POS type for the token, determined by the semantic tagger 216. In some embodiments, a POS tag is not provided to query tokens, and thus a null embedding (e.g., a padded embedding) may be assigned to the POS embedding of each query token in horizontal row 452. The padded embeddings for POS embeddings for the query tokens are indicated as $E_{p[PAD]}$. The POS embeddings for the document tokens are indicated as $E_{p[Token_{index}]}$. The NER and POS embeddings may be collectively referred to as semantic embeddings of the tokens.

The horizontal row 454 shows a line-index embedding for each token of the multiset of tokens 410. The line-index embedding indicates the line-index determined for the token by the layout tagger 220. As noted above, the layout tagger 220 may tag a document token with its associated line-index. Because query tokens may not be assigned a line-index, a null embedding (e.g., a padded embedding) may be assigned to the line-index embedding of each query token in horizontal row 454. The padded embeddings for line-index embeddings for the query tokens are indicated as $E_{l[PAD]}$. The line-index embeddings for the document tokens are indicated as $E_{p[Token_{index}]}$.

The horizontal row 456 shows a section-type embedding for each token of the multiset of tokens 410. The section-type embedding indicates the section type determined for the token's associated document section as determined by the section classifier 214. As noted above, the layout tagger 220 may tag a document token with its associated section type. Because query tokens may not be associated with a document section, a null embedding (e.g., a padded embedding) may be assigned to the section type embedding of each query token in horizontal row 456. The padded embeddings for section-type embeddings for the query tokens are indicated as $E_{t[PAD]}$. The section-type embeddings for the document tokens are indicated as $E_{t[Token_{index}]}$.

The horizontal row 458 shows a document-section embedding for each token of the multiset of tokens 410. The document-section embedding indicates the token's associated document section. Because query tokens may not be associated with a document section, a null embedding (e.g., a padded embedding) may be assigned to the section type embedding of each query token in horizontal row 456. The padded embeddings for document-section embeddings for the query tokens are indicated as $E_{S[PAD]}$. The document-section embeddings for the document tokens are indicated as $E_{S[Token_{index}]}$. The line-index embedding, the section-index embedding, and the section-type embedding, as well as the global-position embedding may be referred to as layout embeddings for the token.

Figure 5:
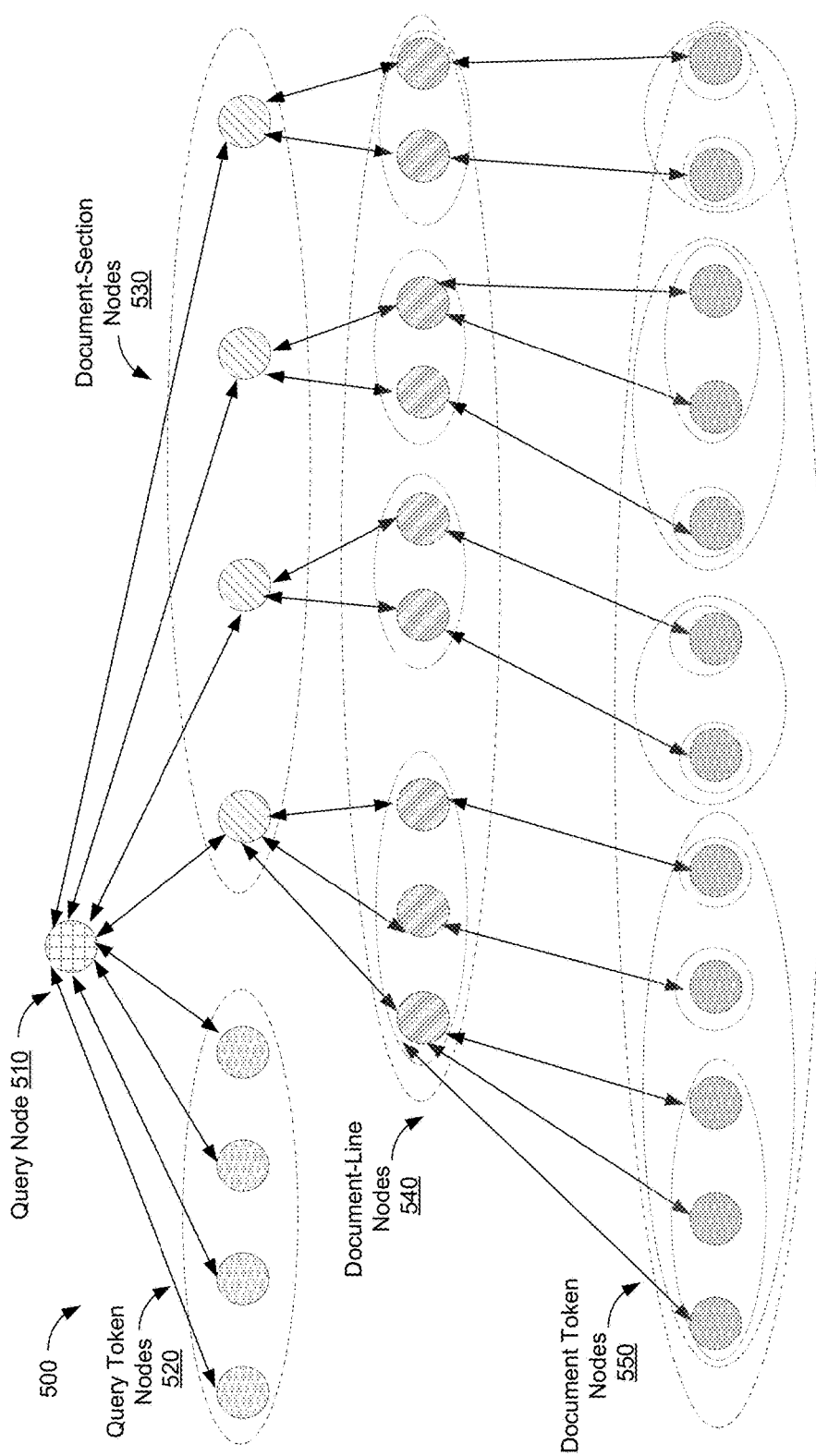
FIG. 5 illustrates a graph data structure based on the spatial layout of an input document and a query, according to various embodiments.

The graph builder 260 is generally responsible for generating a graph data structure based on the nested structure of query and document tokens (e.g., nested structure 400) and the corresponding set of embeddings for each token. The graph builder 260 will be discussed in conjunction with FIG. 5. FIG. 5 illustrates a graph data structure 500 based on the spatial layout of an input document and a query, according to various embodiments. The graph builder 260 may generate graph 500 based on the nested structure (e.g., nested structure 400 of FIG. 4). The graph 500 is a hierarchical graph. The hierarchical structure of the graph may be generally: query→document sections→textual lines→document tokens.

The graph 500 includes a query node 510, a set of query token nodes 520, a set of document-section nodes 530, a set of document-line nodes 540, and a set of document token nodes 550. The query node 510 corresponds to the input query and is associated with a special query token and the query token's embedding. Each of the document-section nodes 530 corresponds to one of the document sections and is assigned a special document-section token and its associated embedding. Each of the document-line nodes 540 corresponds to one of the textual lines of the document and is assigned a special textual line token and its associated embedding. Note that the query node 510 is a root node of the graph 500. Each of the query token nodes and each of the document token nodes is a leaf node of the graph 500.

More specifically, the hierarchical graph 500 includes the query node 500 as a root node. The query node 510 is at the top of the hierarchy. The query node 510 corresponds to the input query (e.g., input query 302 or input query 312 of FIGS. 3A-3B). The graph also includes a set of query token nodes 520. Each query token node of the set of query token nodes corresponds to one of the query tokens (e.g., the multiset of query tokens 412 of FIG. 4) and the query tokens' associated set of embeddings (e.g., the set of embeddings in a vertical arrangement above the query token in FIG. 4.) The query node 510 is connected (via a directed edge from the query node 500 to the query token node) to each query token node in the set of query token nodes 520.

The next layer of the graph's hierarchy, below the query layer, is the document-section layer that includes a set of document-section nodes 530. Each document-section node in the set of document-section nodes 510 corresponds to one of the document sections of the set of document sections of the input document (input document 300 or input document 310 of FIGS. 3A-3B). Below the set of document section nodes 530 in the hierarchy of the graph 500 is the textual line layer that includes a set of document-line nodes 540. Each node of the set of document-line nodes corresponds to a textual line of the input document. The bottom layer of the hierarchy is the document-token layer that includes a set of document token nodes 550. Each document token node of the set of document token nodes corresponds to one of the document tokens and its set of embeddings (e.g., the set of embeddings in a vertical arrangement above the query token in FIG. 4.).

The query node 510 may include or correspond to a query token, with a query token embedding. In addition to being connected to each query token node, the query node 510 is connected to each document-section node of the set of document-section nodes. Each document section node of the set of document-section nodes may correspond to or include a document-section token, with a document-section embedding that corresponds to the document-section associated with the document-section node. Each document section node is connected to each of its corresponding document-line nodes corresponding to lines included in the corresponding document section. Each document-line node may include or correspond to a document-line token, with a document-line embedding corresponding to document-line associated with the line node. Each document-line node may be connected to each of the document tokens included in the line.

The graph attention network (GAT) 270 includes a transformer encoder 272 that generates an encoding of the graph. More specifically, the GAT 270 generates another embedding (e.g., a transformed feature vector or transformed representation) for for each embedding The connections in the graph 500 determine the local neighborhood for the graph attention convolution operation, which is similar to what a transformer layer does with masked attention, i.e. each token is only allowed to attend to other tokens it is connected to in the graph. This sparse connectivity of the graph 500 greatly significantly speeds up the model's runtime and lowers the memory requirement compared to a graph with full connectivity, which effectively increases the length of documents the model can handle. The sparse connectivity of graph 500 also has advantages over purely local connectivity patterns (e.g. every token only can attend to tokens with a linear distance of d) because information can propagate efficiently from distant tokens via the page object connections.

The response identifier 280 is generally responsible for employing the encoding of the graph 500 (generated by the GAT 270) to determine a portion of the document that includes the response to the query. The response identifier 280 may include a section identifier (e.g., section identifier 282) that determines which document section includes the response. The line identifier 284 is generally responsible for determining which textual lines of the document include the response. The span identifier 286 is generally responsible for determining the span of the documents tokens (within the identified document section and the identified textual line) includes the response. In addition to predicting if each text token is part of the answer span, a prediction for whether each line and page object special token in the answer is contained within that line or page object. This additional prediction may become part of a loss function and helps the model attend to the general region where the answer can be found in addition to searching for the exact answer span.

Generalized Processes for Enhanced DocVQA Oracles

Figure 6:
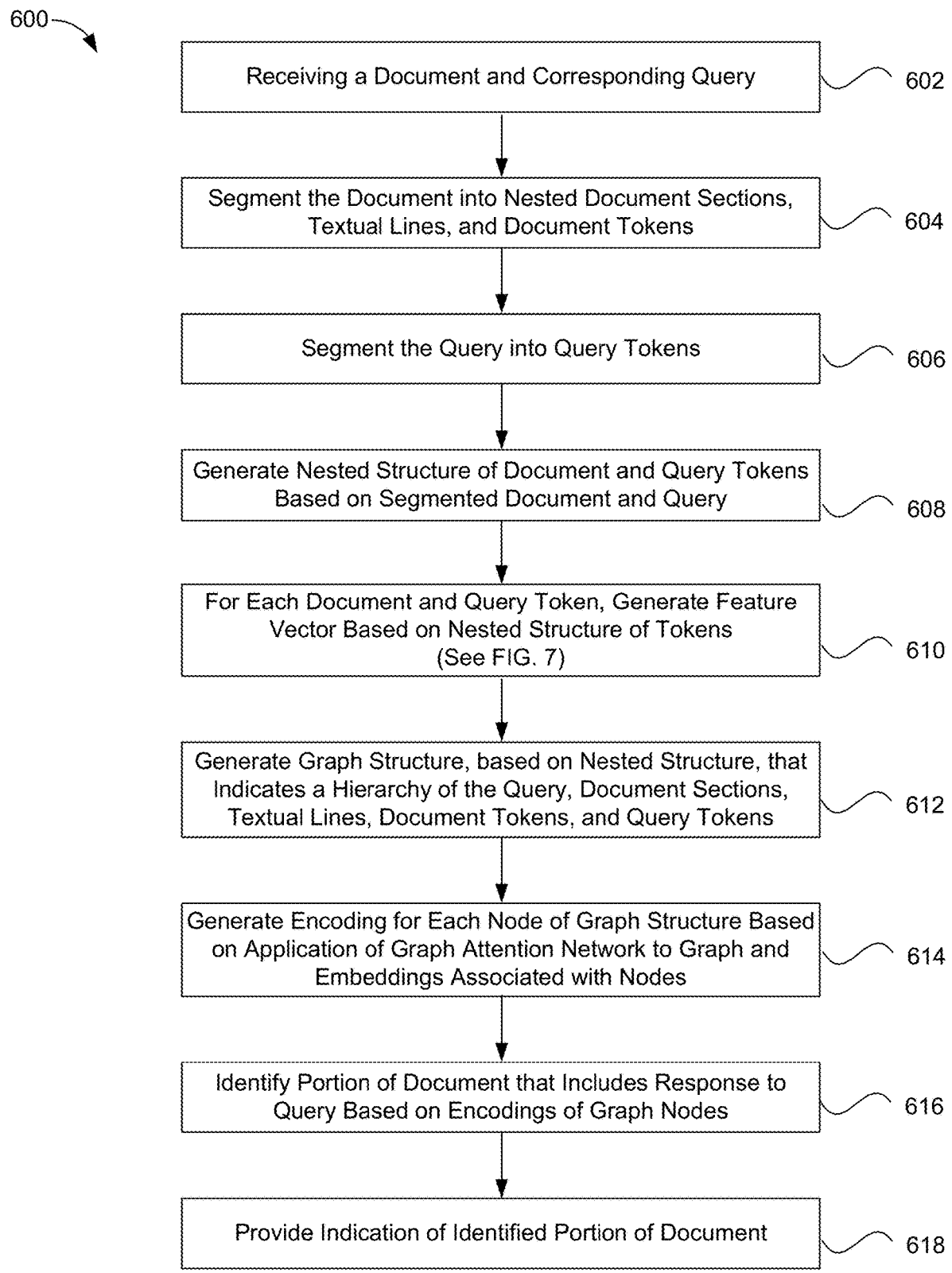
FIG. 6 illustrates one embodiment of an enhanced method for performing a DocVQA task, which is consistent with the various embodiments presented herein.
Figure 7:
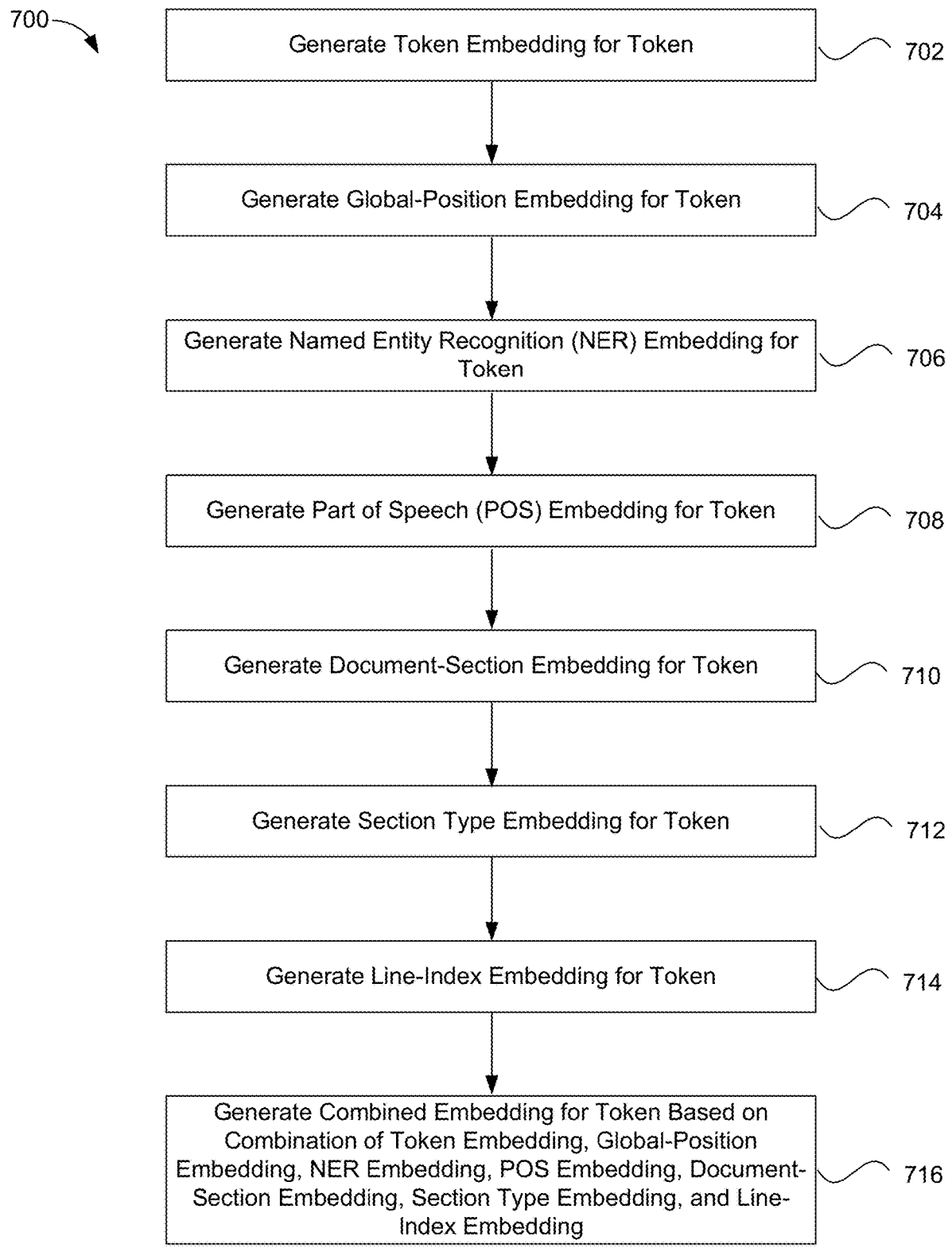
FIG. 7 illustrates one embodiment of an enhanced method for generating a feature vector for a token, which is consistent with the various embodiments presented herein.
Figure 8:
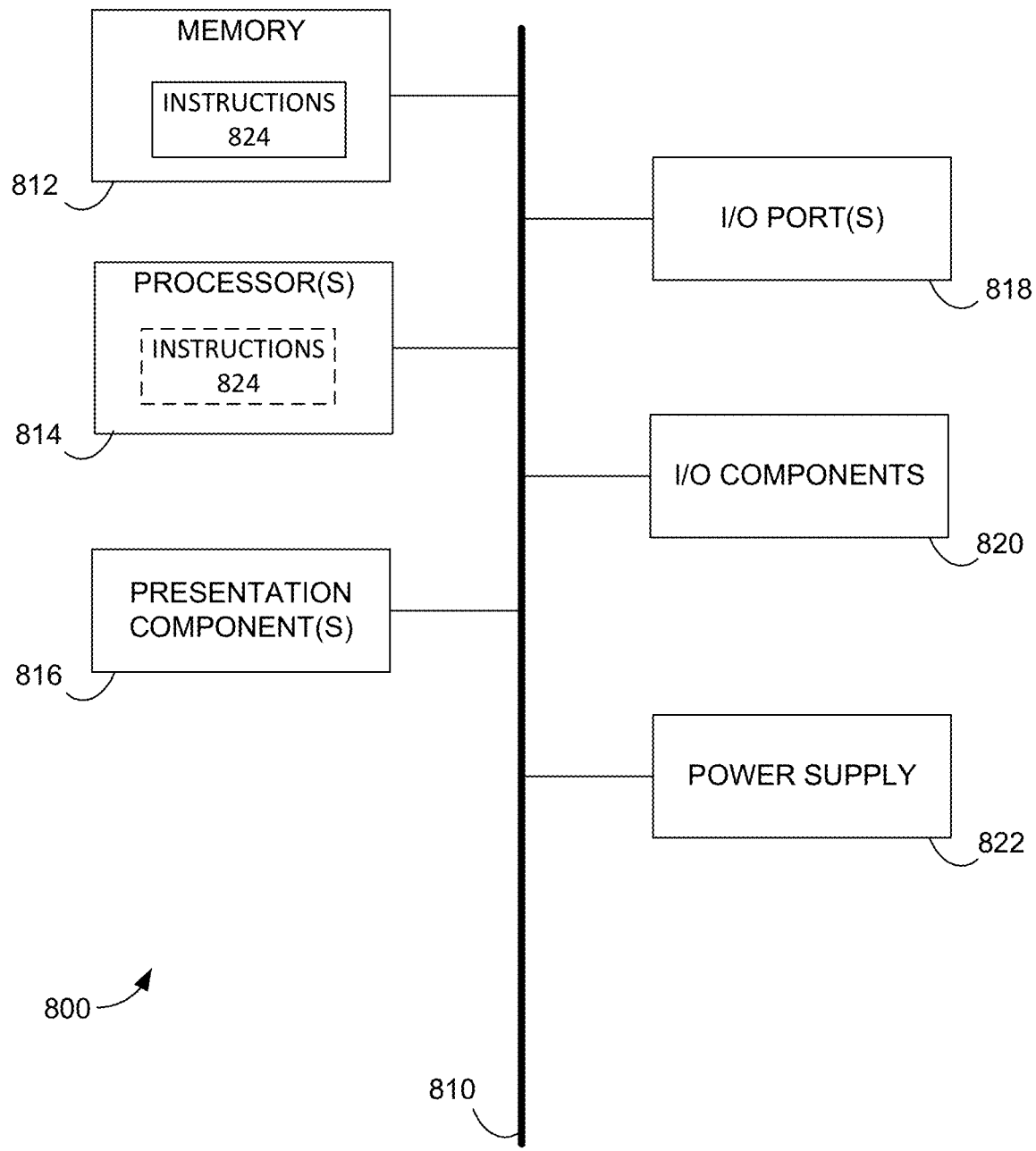
FIG. 8 is a block diagram of an example computing device in which embodiments of the present disclosure may be employed.

Process 600-700 of FIGS. 6-7, or portions thereof, may be performed and/or executed by any computing device, such as but not limited to, client computing device 102 of FIG. 1, server computing device 104 of FIG. 1, and/or computing device 800 of FIG. 8. Additionally, a DocVQA oracle, such as but not limited to DocVQA oracle 120 of FIG. 1 and/or DocVQA oracle 200 of FIG. 2, may perform and/or execute at least portions of processes 600-700.

FIG. 6 illustrates one embodiment of an enhanced method 600 for performing a DocVQA task, which is consistent with the various embodiments presented herein. Process 600 (and process 700 of FIG. 700) may be performed by a DocVQA oracle, such as but not limited to DocVQA oracle 120 of FIG. 1 and/or DocVQA oracle 200 of FIG. 2. As such, when performing a DocVQA task, a DocVQA oracle may implement any combination of the various steps, actions, operations, and/or functionalities associated with any of the blocks of methods 600-700.

Process 600 begins at block 602, where each of a document and a corresponding query are received. For instance, input document 112 and query 114 of FIG. 1 may be received at block 602. Other non-limiting examples of receiving a document and corresponding query include receiving input document 300 and corresponding input query 302 of FIG. 3A (or input documents 310 and input query 312 of FIG. 3B). At block 604, the document may segmented into nested document sections, textual lines, and document tokens. More particularly, the document may be segmented into a set of document sections. Each section may be segmented into a set of textual lines. Each textual line may be segmented into a multiset of document tokens. At block 606, the query may be segmented into a multiset of query tokens. The multiset of document tokens and the multiset of query tokens may form a multiset of tokens. The document segmenter 212 of FIG. 2 may segment the document and the query.

At block 608, a nested structure of document and query tokens may be generated based on the segmented document and query. For example, nest generator 224 of FIG. 2 may generate a nested structure of tokens (e.g., nested structure 400 of FIG. 4). At block 610, for each document and query token, a feature vector is generated based on the nested structure of tokens. Various embodiments of generating a feature vector for each token are discussed at least in conjunction with process 700 of FIG. 7. However, briefly here, a set of embeddings (e.g., see embeddings 440 of FIG. 4) may be generated for each token. The set of embeddings for each token may be combined (e.g., concatenated or added) to generate a combined embedding (or feature vector) for the token. A transformer embedder (e.g., transformer embedder 240 of FIG. 2) may generate the set of embeddings and the feature vector for each token.

At block 612, a graph structure may be generated based on the nested structure. The graph structure may indicate a hierarchy of the query, document sections, textual lines, document tokens, and query tokens. For instance, a graph builder (e.g., graph builder 260 of FIG. 2) may generate a graph (e.g., graph 500 of FIG. 5) based on the nested structure of the multiset of tokens (e.g., nested structure 400). At block 614, an encoding for each node of the graph may be generated based on an application of a GAT on the graph (e.g., the embeddings or feature vectors that the nodes represent may serve as input to the GAT). At block 616, a portion of the document that includes a response to the query is selected and/or identified. The identification of the portion of the document is based on the encodings of the graph nodes. At block 618, an indication of the identified portion of the document is provided. For example, as shown in FIG. 1, a bounding box 116 (or highlight) may be superimposed on the document to provide an indication of the identified portion of the document that includes a response to the query.

FIG. 7 illustrates one embodiment of an enhanced method 700 for generating a feature vector for a token, which is consistent with the various embodiments presented herein. A transformer embedder (e.g., transformer embedder 240 of FIG. 2) may perform at least some portions of method 700. Method 700 begins at block 702, where a token embedding is generated for the token. A token embedder (e.g., token embedder 254 of FIG. 2) may employ one or more language models (e.g., a BERT-like language model such as but not limited to ALBERT) to generate the token embedding for the token. Such a token embedding may be similar to any of the token embeddings 462 of FIG. 4.

At block 704, a global-position embedding may be generated for the token. A global-position embedder (e.g., global-position embedder 252 of FIG. 2) may generate the global-position embedding based on the token's global position in a nested structure of tokens (e.g., nested structure 400 of FIG. 4). Such a global-position embedding may be similar to any global-position embeddings 460 of FIG. 4.

At block 706, a NER embedding may be generated for the token. A NER embedder (e.g., NER embedder 242 of FIG. 2) may generate the NER embedding based on a semantic analysis of the token. Such a NER embedding may be similar to any of NER embeddings 450 of FIG. 4. If the token is a query token, the NER embedding may be a "padded" or "null" embedding.

At block 708, a POS embedding may be generated for the token. A POS embedder (e.g., POS embedder 244 of FIG. 2) may generate the POS embedding based on a semantic analysis of the token. Such a POS embedding may be similar to any of POS embeddings 450 of FIG. 4. If the token is a query token, the POS embedding may be a "padded" or "null" embedding.

At block 710, a document-section embedding may be generated for the token. A document-section embedding may be a section-index embedding. A section-index embedder (e.g., section-index embedder 250 of FIG. 2) may generate the document-section embedding based on which document section is associated with the token, via its document-section index. Such a document-section embedding may be similar to any of document-section (or section-index) embeddings 458 of FIG. 4. If the token is a query token, the document-section embedding may be a "padded" or "null" embedding.

At block 712, a section-type embedding may be generated for the token. A section-type embedder (e.g., section-type embedder 248 of FIG. 2) may generate the section-type embedding based on the section type of the document section that is associated with the token. Such a section-type embedding may be similar to any of section-type (or section-index) embeddings 456 of FIG. 4. If the token is a query token, the section-type embedding may be a "padded" or "null" embedding.

At block 714, a line-index embedding may be generated for the token. A line-index embedder (e.g., line-index embedder 246 of FIG. 2) may generate the line-index embedding based on the line of the document section that is associated with the token. Such a line-index embedding may be similar to embeddings 456 of FIG. 4. If the token is a query token, the line-index embedding may be a "padded" or "null" embedding.

At block 716 a combined a combined embedding is generated for the token. The token embedding, global-position embedding, NER embedding, POS embedding, document-section embedding, section-type embedding, and the line-index embedding may be collectively referred to as a set of embeddings for the token. The combined embedding may be a combination of each of the embeddings in the set of embeddings. The combined embedding may be referred to as a feature vector for the token.

Additional Embodiments

Some embodiments include an enhanced method for performing a DocVQA task. The method may be performed by a document search engine or a DocVQA oracle, such as but not limited to DocVQA oracle 120 of FIG. 1 and/or DocVQA oracle 200 of FIG. 2. In some embodiments, a multiset of tokens is accessed and/or received. The multiset of tokens may include a multiset of document tokens included in a received document (e.g., input document 112 of FIG. 1). The multiset of tokens may additionally encoded a multiset of query tokens encoded in a received query (e.g., query 114 of FIG. 1). A nested structure (e.g., nested structure 400 of FIG. 4) of the multiset of tokens may be generated based on a document structure of the document. Each token of the multiset of tokens may occupy a position of a set of nested positions within the nested structure of tokens.

A graph structure (e.g., graph structure 500 of FIG. 5) may be generated. The graph structure may include a set of nodes and a set of edges. The set of nodes may include a query node, a set of query token nodes, a set of document-section nodes, a set of document-line nodes, and a set of document token nodes. Each document token of the multiset of document tokens may be associated with a document-token node of the set of document token nodes (which is a first subset of the set of nodes). Each query token of the multiset of query tokens may be associated with a query token node of the set of query token nodes (which is a second subset of the set of nodes). The set of edges connects each node of the set of nodes to one or more other nodes of the set of nodes based on positions that each associated document token and each associated query token occupies in the set of nested positions within the nested structure.

A GAT may be applied on the graph structure. The GAT applies a self-attention mechanism to nodes of the set of nodes that are connected by the set of edges. The GAT generates a representation (an embedding and/or feature vector) for each node of the set of nodes based on the self-attention. Based on the representation of each node in the set of nodes, an indication of a portion of the document that encodes a multiset of response tokens is provided. The multiset of response tokens may be associated with a response to the query. For example, a highlight (e.g., bounding box 116 of FIG. 1) of the portion of the document that includes text that answers the question may be provided.

In some embodiments, a set of embeddings may be generated based on a language model and the nested structure. For example, the set of embeddings 440 may be generated. The set of embeddings may include a set of document-token embeddings and a set of query-token embeddings. Each document-token embedding of the set of document-token embeddings may be a feature vector (or combined embedding) of a document token of the multiset of document tokens. Each query-token embedding of the set of query-token embeddings may be a feature vector (or combined embedding) of a query token of the multiset of query tokens. For example, the feature vectors of the document and query tokens may be represented by the combined embeddings (indicated by the addition signs) in the set of embeddings 440 of FIG. 4.

The embodiments may include causing the application of the GAT on the graph structure based on a first one-to-one correspondence and a second one-to-one correspondence. The first one-to-one correspondence may be between the set document-token embeddings and the set of document nodes. The second one-to-one correspondence may be between the set of query-token embeddings and the set of query nodes. The self-attention mechanism may be applied between embeddings of the set of embeddings that correspond to nodes of the set of nodes that are connected by the set of edges.

In some embodiments, the document may be segmented into a set of document sections. A sequential-order of the set of document sections may be determined. Each document section of the set of document sections may be segmented into a set of textual lines. For each line of the set of lines of each document section of the set of document sections, the line may be segmented into a multiset of line tokens. The multiset of line tokens of each line of the set of lines of each document section of the set of document sections may includes a submultiset of the set of document tokens. Each line token of the multiset of line tokens may correspond to a document token of the multiset of token documents. A sequential-order of the multiset of document tokens may be determined. Determining the sequential-order of the multiset of document tokens may be based on the sequential-order of the set of document sections, a sequential-order of the set of lines of each document section of the set of document sections, and a sequential-order of the multiset of line tokens of each line of the set of line of each document section of the set of document sections.

The document structure may be determined such that each token document of the multiset of token documents is labeled via a set of elements that includes at least a section-index element, a line-index element, and a global-position element. A value for the section-index element for a specific token of the multiset of document tokens may indicate a location, within the sequential-order of the set of document sections, of a specific document section of the set of document sections corresponding to the specific token. A value of the line-index element of the specific token may indicate a location, within the sequential-order of the set of lines of the specific document section, of a specific line of the set of lines of the specific document section corresponding to the specific token. A value of the global-position element may indicate a location, within the sequential-order of the multiset of document tokens, corresponding to the specific token.

In some embodiments, the set of elements may further include a token-type element. The token-type element may indicate whether the token is a document token or a query token. Thus, for each token of the multiset of tokens, a value may be assigned to the token-type element of the set of elements for the token. The value assigned to the token-type element of the token is one of a query-type token or a document-type token. Assigning the token-type element to the token may be based on whether the token is included in the multiset of query tokens or whether the token is included in the multiset of document tokens. For each token of the multiset of tokens, a value may be assigned to the section-index element of the set of elements for the token. The value assigned to the section-index element of the token may indicate a null value when the value of query-type is assigned to the token's token-type element. For each token of the multiset of tokens, a value may be assigned to the line-index element of the set of elements for the token. The value assigned to the section-index element of the token may indicate a null value when the value of query-type is assigned to the token's token-type element.

In various embodiments, for each token of the multiset of tokens, a value may be assigned to the global-position element of the set of elements for the token. The value assigned to the section-index element of the token indicates a location, within a sequential-order of the multiset of tokens. For each token of the multiset of tokens, the token may be positioned within the set of nested positions to occupy a position based on the values of each of the token-type element, the section-index element, the line-index element, and the global-position element of the token. A hierarchical structure may be generated based on the occupation of the set of nested positions by the multiset of tokens. The graph structure may be generated to be isomorphic to the hierarchical structure such that the graph structure is a hierarchical graph structure.

In some embodiments, the set of elements further includes a section-type element, a named-entity-recognition NER) element, and a part-of-speech (POS) element. For each document section of the set of document sections, the document section may be classified as one or more section types of a set of section types. For each document token of the multiset of document tokens, the document token may be classified as one or more named-entity-recognition (NER) types of a set of NER types. For each document token of the multiset of document tokens, the document token may be classified as one or more part-of-speech (POS) types of a set of POS types. For each token of the multiset of tokens, a value may be assigned to the section-type element of the set of elements for the token. The value assigned to the section-type element of the token may indicate a null value when the value of query-type is assigned to the token's token-type element. The value assigned to the section-type element of the token may indicate the one or more section types associated with the token's section-index when the value of document-type is assigned to the token's token-type element. For each token of the multiset of tokens, a value may be assigned to the NER-type element of the set of elements for the token. The value assigned to the NER-type element of the token may indicate a null value when the value of query-type is assigned to the token's token-type element. The value assigned to the NER-type element of the token may indicate the one or more NER types that classify the token when the value of document-type is assigned to the token's token-type element.

For each token of the multiset of tokens, a value may be assigned to the POS-type element of the set of elements for the token. The value assigned to the POS-type element of the token may indicate a null value when the value of query-type is assigned to the token's token-type element. The value assigned to the POS-type element of the token may indicate the one or more POS types that classify the token when the value of document-type is assigned to the token's token-type element. For each token of the multiset of tokens, a set of embeddings may be generated based on a language model and the set of elements for the token. The application of the GAT on the graph structure may be caused based on the set of embeddings for each token of the multiset of tokens.

In various embodiments, for each token of the multiset of tokens, a set of token embeddings may be generated based on a language model. A sequential-order of the multiset of document tokens may be determined based on a sequential-order of the multiset of query tokens and the document. The document structure may be determined or generated based on the sequential-order of the multiset of document tokens. For each token of the multiset of tokens, a set of document-structure embeddings may be generated based on the determined document structure and one or more document-structure features of the token. For each token of the multiset of tokens, a set of semantic embeddings may be generated based on the one or more semantic features of the token. For each token of the multiset of tokens, a set of combined-embeddings may be generated based on a combination of the set of token embeddings, the set of document-structure embeddings, and the set of semantic-embeddings of the token. The application of the GAT on the graph structure may be caused based on the set of embeddings for each token of the multiset of tokens.

In at least one embodiment, for each token of the multiset of tokens, a set of embeddings is generated based on a language model. The language model may have been trained by augmenting a set of training documents via a rearrangement of a sequential-order of tokens encoded in each training document of the set of training documents.

Illustrative Computing Device

Having described various embodiments, an example operating environment in which some embodiments are implemented as described below in order to provide a general context for various aspects of the present invention. Referring to FIG. 8, an illustrative operating environment for implementing embodiments of the present invention is shown and designated generally as computing device 800. Computing device 800 is but one example of a suitable computing environment and is not intended to suggest any limitation as to the scope of use or functionality of the invention. Neither should the computing device 800 be interpreted as having any dependency or requirement relating to any one or combination of components illustrated.

Embodiments of the invention may be described in the general context of computer code or machine-readable instructions, including computer-executable instructions such as program modules, being executed by a computer or other machine, such as a smartphone or other handheld device. Generally, program modules, or engines, including routines, programs, objects, components, data structures, etc., refer to code that perform particular tasks or implement particular abstract data types. Embodiments of the invention may be practiced in a variety of system configurations, including hand-held devices, consumer electronics, general-purpose computers, more specialized computing devices, etc. Embodiments may also be practiced in distributed computing environments where tasks are performed by remote-processing devices that are linked through a communications network.

With reference to FIG. 8, computing device 800 includes a bus 810 that directly or indirectly couples the following devices: memory 812, one or more processors 814, one or more presentation components 816, input/output ports 818, input/output components 820, and an illustrative power supply 822. Bus 810 represents what may be one or more busses (such as an address bus, data bus, or combination thereof). Although the various blocks of FIG. 8 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 8 is merely illustrative of an example computing device that can be used in connection with one or more embodiments of the present disclosure. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile and/or nonvolatile memory. Memory 812 may be non-transitory memory. As depicted, memory 812 includes instructions 824. Instructions 824, when executed by processor(s) 814 are configured to cause the computing device to perform any of the operations described herein, in reference to the above discussed figures, or to implement any program modules described herein. The memory may be removable, non-removable, or a combination thereof. Illustrative hardware devices include solid-state memory, hard drives, optical-disc drives, etc. Computing device 800 includes one or more processors that read data from various entities such as memory 812 or I/O components 820. Presentation component(s) 816 present data indications to a user or other device. Illustrative presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "A), (B), or (A and B)." The phrase "at least one of A, B and C" means "A), (B), (C), (A and B), (A and C), (B and C) or (A, B and C)."

What is claimed:

1. A non-transitory computer-readable storage medium having instructions stored thereon, which, when executed by a processor of a computing device cause the computing device to perform actions comprising:
   receiving a query associated with a document, the query comprising a multiset of query tokens and the document comprising a multiset of document tokens;
   generating a multiset of tokens comprising the multiset of query tokens and the multiset of document tokens;
   generating a nested structure based on a document structure of the document, wherein each token of the multiset of tokens occupies a position of a set of nested positions within the nested structure;
   for each token of the multiset of tokens, generating a set of combined-embeddings based on a combination of a set of semantic embeddings including a named-entity-recognition (NER) embedding and a part-of-speech (POS) embedding and a set of layout embeddings including a line-index embedding, a section-index embedding, and a section-type embedding indicating a type of section associated with the corresponding token;
   generating a graph structure based on the nested structure and corresponding set of combined-embeddings for each token, wherein the graph structure includes a set of nodes corresponding to the set of document tokens and the set of query tokens, wherein the set of nodes are connected via a set of edges of the graph structure based on the nested structure;
   inputting the graph structure into a graph neural network (GAT);
   selecting, using the GAT and based on the graph structure and the set of combined-embeddings for each token of the multiset of tokens, a portion of the document comprising a sub-multiset of the multiset of document tokens; and
   providing a reference of the selected portion of the document as a response to the query.

2. The computer-readable storage medium of claim 1, wherein each document token of the multiset of document tokens is associated with a document node of a set of document nodes that is a first subset of the set of nodes, each query token of the multiset of query tokens is associated with a query node of a set of query nodes that is a second subset of the set of nodes, the set of edges connects each node of the set of nodes to one or more other nodes of the set of nodes based on positions that each associated document token and each associated query token occupies in the set of nested positions within the nested structure, and the selected portion of the document is selected based on an application of the GAT on the graph structure that applies a self-attention mechanism to nodes of the set of nodes that are connected by the set of edges.

3. The computer-readable storage medium of claim 2, wherein the GAT applies a self-attention mechanism between embeddings of the set of combined-embeddings that correspond to nodes of the set of nodes that are connected by the set of edges.

4. The computer-readable storage medium of claim 1, wherein the actions further comprise:
   determining the document structure such that each document token of the multiset of document tokens is labeled via a set of elements that includes a global-position element.

5. The computer-readable storage medium of claim 4, wherein the set of elements further includes a token-type element and the actions further comprise:
   for each token of the multiset of tokens, positioning the token within the set of nested positions to occupy a position based on values associated with each of the token-type element, the section-index element, the line-index element, and the global-position element of the token;

generating a hierarchical structure based on the occupation of the set of nested positions by the multiset of tokens; and generating the graph structure to be isomorphic to the hierarchical structure such that the graph structure is a hierarchical graph structure.

6. The one or more computer-readable storage media of claim 5, the actions further comprising:

causing an application of the GAT on the graph structure based on the set of combined embeddings for each token of the multiset of tokens.

7. The one or more computer-readable storage media of claim 1, wherein the actions further comprise:

the set of combined-embeddings is generated based on a language model, wherein the language model was trained by augmenting a set of training documents via a rearrangement of a sequential-order of tokens encoded in each training document of the set of training documents.

8. A method comprising:

obtaining a graph structure that includes a set of nodes and a set of edges that connect nodes of the set of nodes, wherein a first node of the set of nodes corresponds with a set of embeddings of a query token and a second node of the set of nodes corresponds with a set of embeddings of a document token; and training a graph attention network (GAT) based on the graph structure to generate a trained GAT enabled to facilitate selection of a portion of a document that encodes a multiset of response tokens associated with a response to a query, wherein training includes using predictions of document tokens to include in responses to queries and/or using predictions of lines and document sections including spans of document tokens included in responses to queries.

9. The method of claim 8, wherein the portion of the document is selected based on an application of the GAT, on a new graph structure generated for the document, that applies a self-attention mechanism to nodes of the new graph structure.

10. The method of claim 8, wherein data augmentation is used to generate additional training samples for training the GAT.

11. The method of claim 10, wherein data augmentation is performed by permuting an order of sections of the document when sequencing document tokens to generate the additional training samples.

12. The method of claim 8, wherein the set of embeddings of the query token and the set of embeddings of the document token are generated based on a language model.

13. The method of claim 8 further comprising:

receiving the query;

receiving the document;

generating a new graph structure that includes a first set of nodes corresponding to a first set of tokens associated with the document and a second set of tokens associated with the query;

inputting the new graph structure into the trained GAT; and selecting, using the GAT, the portion of the document that encodes the multiset of response tokens associated with the response to the query.

14. The method of claim 13, wherein the new graph structure is based on a nested structure associated with a document structure of the document.

15. A computing system, comprising:

a processor device; and a memory device coupled with the processor device, the processor device to perform actions comprising:

accessing a multiset of tokens-, wherein a query encodes a multiset of query tokens included in the multiset of tokens, and a document encodes a multiset of document tokens included in the multiset of tokens;

generating a nested structure based on a document structure of the document, wherein each token of the multiset of tokens occupies a position of a set of nested positions within the nested structure;

for each token of the multiset of tokens, generating a set of combined-embeddings based on a combination of a set of semantic embeddings including a set of layout embeddings including a section-type embedding indicating a type of section associated with the corresponding token;

generating a graph structure based on the nested structure and corresponding set of combined-embeddings for each token, wherein the graph structure includes a set of nodes and a set of edges, wherein each document token of the multiset of document tokens is associated with a document node of a set of document nodes that is a first subset of the set of nodes, each query token of the multiset of query tokens is associated with a query node of a set of query nodes that is a second subset of the set of nodes, and the set of edges connects each node of the set of nodes to one or more other nodes of the set of nodes based on positions that each associated document token and each associated query token occupies in the set of nested positions within the nested structure; and providing an indication of a portion of the document that encodes a multiset of response tokens associated with a response to the query and is included in the multiset of document tokens, wherein the portion of the document is selected based on an application of a graph attention network (GAT) on the graph structure that applies a self-attention mechanism to nodes of the set of nodes that are connected by the set of edges.

16. The system of claim 15, wherein each document token of the multiset of document tokens is associated with a document node of a set of document nodes that is a first subset of the set of nodes, each query token of the multiset of query tokens is associated with a query node of a set of query nodes that is a second subset of the set of nodes, and the set of edges connects each node of the set of nodes to one or more other nodes of the set of nodes based on positions that each associated document token and each associated query token occupies in the set of nested positions within the nested structure.

17. The system of claim 15, wherein the actions further comprise:

determining a sequential-order of the multiset of document tokens based on a sequential-order of the multiset of query tokens and the document; and determining the document structure based on the sequential-order of the multiset of document tokens;

causing an application of the GAT on the graph structure based on the set of combined-embeddings for each token of the multiset of tokens.

18. The system of claim 15, wherein a second computing system provides the query and the document.

* * * * *